(12) United States Patent
Uehara

(10) Patent No.: US 9,098,640 B2
(45) Date of Patent: Aug. 4, 2015

(54) CONTROLLER, ELECTRONIC EQUIPMENT UNIT, AND USB DEVICE CONTROL METHOD

(71) Applicant: Noriyuki Uehara, Kanagawa (JP)

(72) Inventor: Noriyuki Uehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/905,550

(22) Filed: May 30, 2013

(65) Prior Publication Data

US 2013/0346650 A1    Dec. 26, 2013

(30) Foreign Application Priority Data

Jun. 25, 2012    (JP) ................. 2012-142271

(51) Int. Cl.
*G06F 3/12*    (2006.01)
*G06F 13/38*    (2006.01)
(52) U.S. Cl.
CPC ...... *G06F 13/385* (2013.01); *G06F 2213/0042* (2013.01); *G06F 2213/4002* (2013.01)
(58) Field of Classification Search
CPC ................ G06F 2213/4002; G06F 2213/0042; G06F 13/385
USPC .............................................. 710/313, 60, 63
See application file for complete search history.

(56) References Cited

U.S. PATENT DOCUMENTS

| 2004/0088449 | A1* | 5/2004 | Sakaki .......................... 710/15 |
| 2006/0294272 | A1* | 12/2006 | Chou et al. ..................... 710/62 |
| 2009/0100209 | A1* | 4/2009 | Szabelski ...................... 710/313 |
| 2009/0287856 | A1* | 11/2009 | Ito ................................. 710/19 |
| 2011/0016253 | A1* | 1/2011 | Kakish et al. ................. 710/313 |
| 2011/0179201 | A1* | 7/2011 | Monks et al. .................. 710/60 |

FOREIGN PATENT DOCUMENTS

| JP | 2009-048444 | 3/2009 |
| JP | 2011-039745 | 2/2011 |

* cited by examiner

*Primary Examiner* — Ernest Unelis
(74) *Attorney, Agent, or Firm* — Harness, Dickey & Pierce, P.L.C.

(57) ABSTRACT

A controller for communicating with a USB (universal serial bus) device via a USB is disclosed. The controller includes a registering unit which associates topology information of a USB hub to which the USB device is connected via the USB and a special control scheme for performing a special control of the USB device which is connected to the USB hub to register the associated result; a processing unit which specifies the special control scheme corresponding to the topology information of the USB hub to which the USB device is connected based on the registered information; and the USB hub which executes control of the USB device connected to the USB hub based on the special control scheme specified by the processing unit.

12 Claims, 4 Drawing Sheets

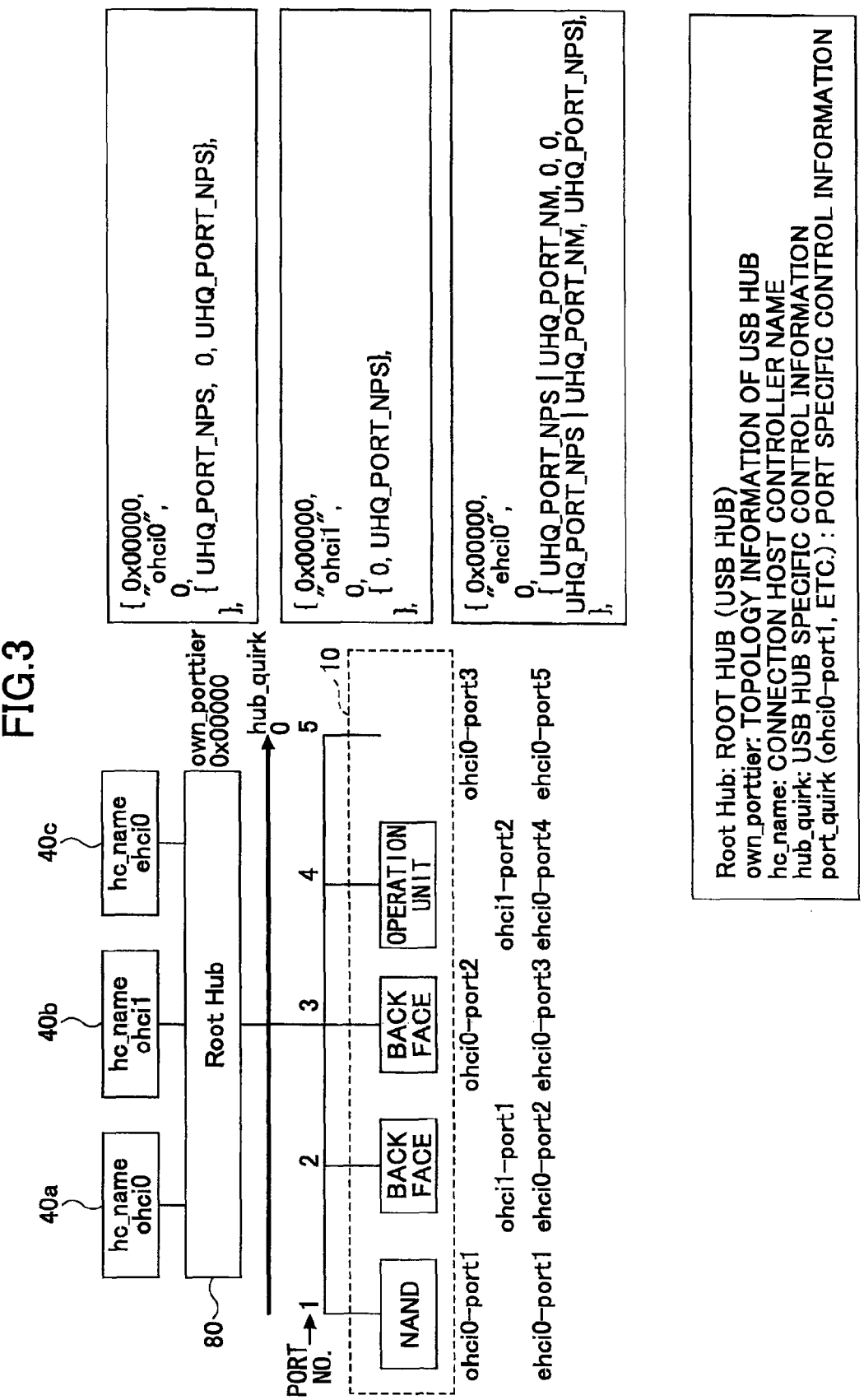

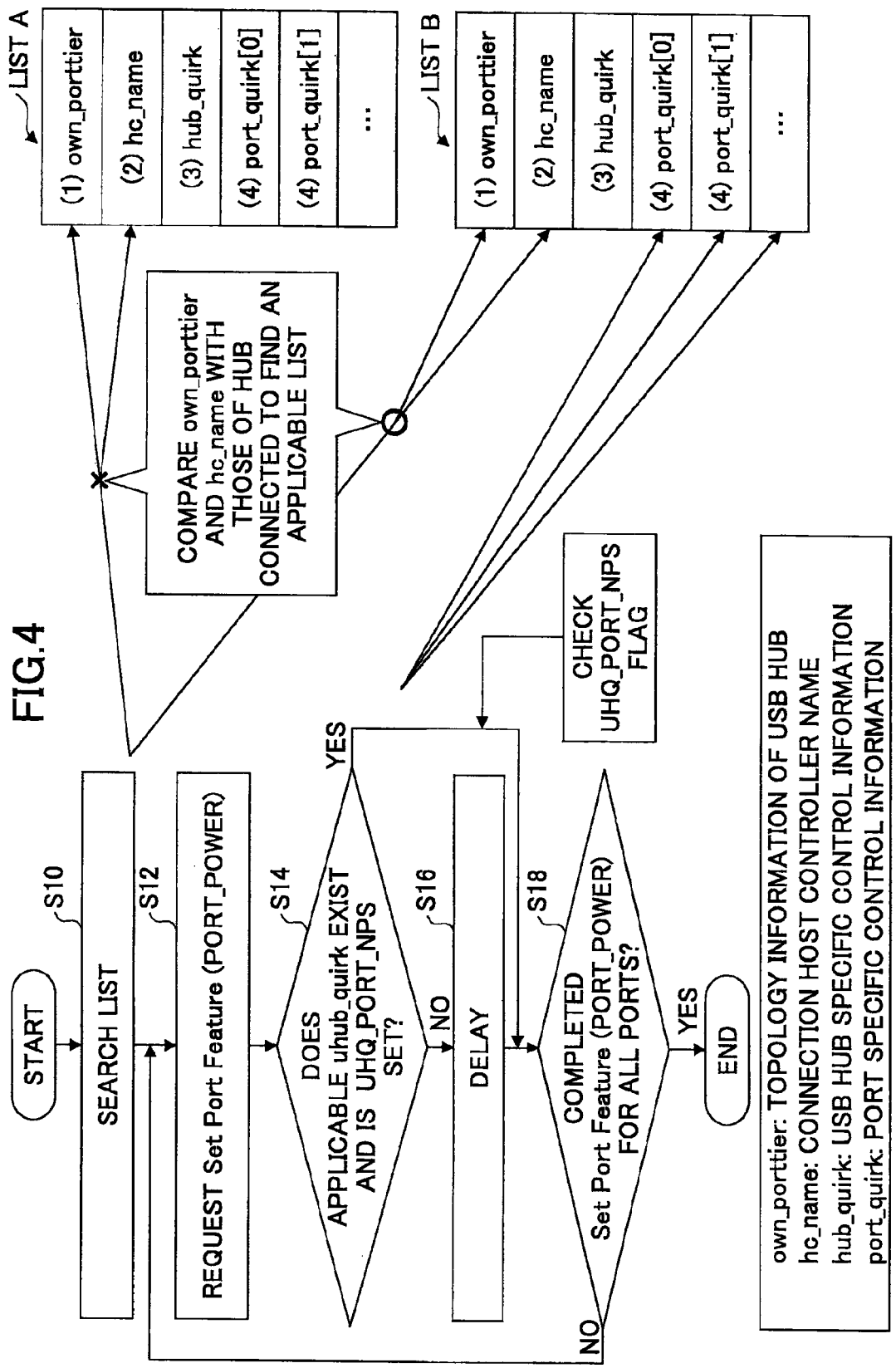

CONTROLLER, ELECTRONIC EQUIPMENT UNIT, AND USB DEVICE CONTROL METHOD

TECHNICAL FIELD

The present invention relates to controllers, electronic equipment units, and USB device control methods.

BACKGROUND ART

In order for a USB (universal serial bus) host computer to complete a connection recognition of a USB device, a delay which complies with a USB standard for reset completion waiting or address allocation becomes necessary. However, there are some USB devices in the marketplace that do not respond with completing the connection recognition within the delay of a standard value. In order to use a device which does not respond within the delay of the standard value, a delay which is a margin is applied and the standard value to lengthen a response time of the USB device.

For example, Patent document 1 discloses a scheme of adding a margin, by an external input, to a USB device which does not operate within the delay of the standard value.

If it can be recognized as to which device does not operate within the delay of the standard value, a further margin may be added to the delay for a specific USB device. However, this scheme requires knowing individual device operations in advance for all USB devices and is unrealistic. Therefore, in order to cause any USB device to respond, it is necessary to use a delay of a value in which a margin is added, so that it can handle all USB devices. However, this causes a time until device recognition completion to be long relative to a case in which the delay of the standard value is adapted, causing a boot time to be generally delayed.

For example, Patent document 1 discloses adding a margin to a USB device which does not operate within the delay of the standard value, which stands on an assumption that "whichever device does not operate within the delay of the standard value may be recognized for all USB devices". If this assumption does not hold, inconvenience for a user to add the margin using the external input and a problem of failed recognition of a device at a time of an initial connection can occur.

Moreover, the user does not have any knowledge of the delay, so it is anticipated that a task of adding the margin by the external input is carried out for a first time after a failed recognition of the device. Furthermore, a factor for the failed recognition of the device is not only due to a delay shortage, which could cause the user to misunderstand what the factor is.

Moreover, there may be a case in which a special control scheme is to be applied to a specific USB device, other than a control time (a response time) for the above-described USB device recognition.

PATENT DOCUMENT

Patent document 1: JP2009-048444A

DISCLOSURE OF THE INVENTION

In light of the problems as described above, an object of the present invention is to provide a controller, an electronic equipment unit, and a USB device control method that make it possible to execute special control for a USB device based on a special control method registered in accordance with a USB bus.

According to embodiments of the present invention, a controller for communicating with a USB (universal serial bus) device via a USB is provided, including: a registering unit which associates topology information of a USB hub to which the USB device is connected via the USB and a special control scheme for performing a special control of the USB device which is connected to the USB hub to register the associated result; a processing unit which specifies the special control scheme corresponding to the topology information of the USB hub to which the USB device is connected based on the registered information; and the USB hub which executes control of the USB device connected to the USB hub based on the special control scheme specified by the processing unit.

The present invention makes it possible to execute special control on the USB device based on a special method registered in accordance with the USB bus.

BRIEF DESCRIPTION OF THE DRAWINGS

Other objects, features, and advantages of the present invention will become more apparent from the following detailed descriptions when read in conjunction with the accompanying drawings, in which:

FIG. 3 is a diagram showing an exemplary registration list (for having multiple host controllers) according to one embodiment; and FIG. 4 is a flowchart showing a special control processing according to one embodiment.

BEST MODE FOR CARRYING OUT THE INVENTION

Below, with reference to the drawings, preferred embodiments of the present invention are described. In the present specification and the drawings, for constituting elements having substantially the same functional configuration, repeated explanations are omitted by giving the same letter thereto.

Introduction

Recently, a USB is being spotlighted as a high-speed serial interface. In the USB, transmission and reception of a signal or data are conducted between a USB host controller and a USB device.

In the USB standard are specified various times from a certain signal or data being output to the USB to a following signal or data being output to the USB, or a time at which a signal or data is constantly or periodically output to the USB or during which outputting is continued by a USB host controller in order for the USB controller side to recognize connection conditions of the USB device.

However, in reality, even when a signal or data is output to the USB device in accordance with a time specified in the USB standard by the USB controller, the USB device may not be recognized.

Thus, in the USB host controller according to one embodiment of the present invention that is described below, it is possible to set special control methods for performing a special control of the USB device connected to the USB hub for each USB hub port.

The special control methods include setting the presence/absence of adding a margin to a delay required at a time of recognition processing of a USB device 10; setting a priority at a time of searching for a port; and setting presence/absence of power supplying. In this way, a special control in which, to perform recognition, a margin is added only to a USB device which cannot recognize a USB device due to a delay required for a response from the USB device being too short at a time of connecting the USB device; a special control for achieving a more efficient port search; and a special control for avoiding wasteful power supplying may be executed. As a result, in control of the USB host controller according to the present embodiment, advantageous effects of stability of USB device recognition; speeding up of a device recognition process and boot time; energy savings, etc., may be obtained. Below, a configuration of the USB host controller and an operation thereof according to the present embodiment are described.

(Overall Configuration of System)

Figure 1:
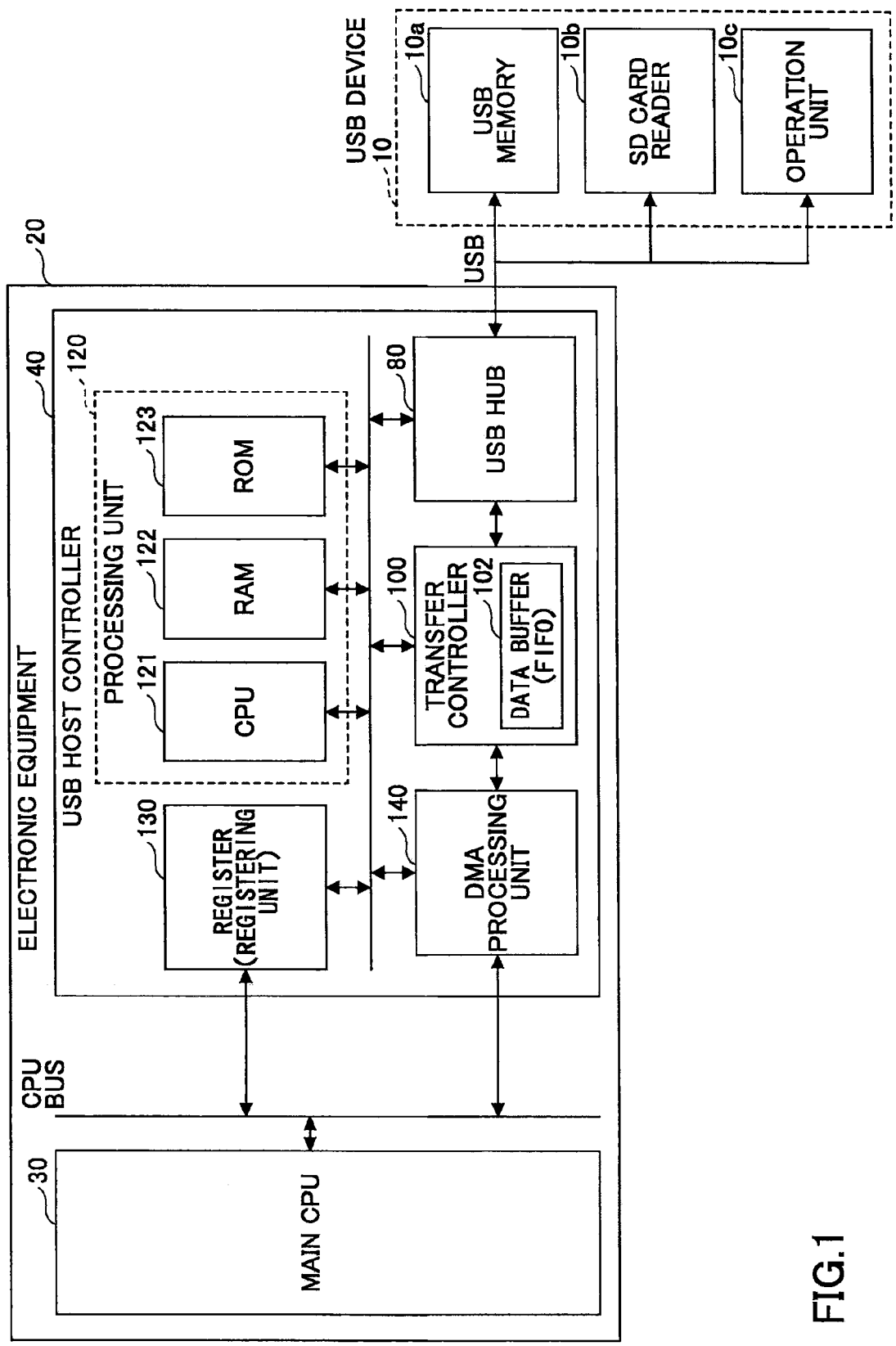
FIG. 1 is a configuration diagram of an electronic equipment unit which includes a controller according to one embodiment.

First, an electronic equipment unit including a USB host controller according to the present embodiment is described with reference to FIG. 1. FIG. 1 is a diagram which shows one example of a configuration of the electronic equipment unit including the USB host controller according to the present embodiment.

An electronic equipment unit 20 includes a main CPU 30 and a USB host controller 40. The USB host controller 40 includes a USB hub 80, a transfer controller 100, a processing unit 120, a register 130 (corresponding to a registering unit), and a DMA processing unit 140. The USB host controller 40 corresponds to a controller for communicating with the USB device via the USB. The USB host controller 40 may be realized as a semiconductor integrated circuit.

As the electronic equipment unit 20 of the present embodiment, various units are possible such as a video camera, a digital camera, a portable music player, a portable video player, an optical disk drive apparatus, a hard disk drive apparatus, an audio equipment unit, a mobile phone, a portable gaming equipment unit, a portable digital assistant, an electronic dictionary, a portable information terminal, etc.

The main CPU 30 performs an overall processing and control of the electronic equipment unit 20. For example, when the electronic equipment unit 20 is a video camera, the main CPU 30 functions as a camera processor and performs control of an imaging device, effect processing of an image, compression processing of the image, etc.

The register 130 is mapped to an address space (a memory space, an I/O space, etc.) of the main CPU 30 and a command issued by the main CPU 30 via a CPU bus is written into the register 130. The USB hub 80, the transfer controller 100, the processing unit 120, and the DMA processing unit 140 operate based on the command written into the register 130. Moreover, into the register 130 is written an operation status such as the USB hub 80, the transfer controller 100, the processing unit 120, the DMA processing unit 140, etc., and the main CPU 30 may read an operation status written into the register 130.

The USB hub 80 is an interface for performing data transfer (high-speed serial transfer) via the USB. To the USB hub 80 is connected the USB device 10 via the USB. The USB hub includes a physical layer circuit which receives and transmits data via the USB (serial bus) and performs the data transfer with the USB device 10. Examples of the USB device 10 include a USB memory 10a, an SD card reader 10b, an operation unit 10c, etc., shown in FIG. 1.

The DMA processing unit 140, which is connected to the CPU bus, receives, from the CPU bus, data to be transmitted to the USB device 10 to DMA transfer the received data to the transfer controller 100 and DMA transfers the data received from the USB device 10 from the transfer controller 100 to the CPU bus.

The transfer controller 100 controls the data transfer between the USB hub 80 and the DMA processing unit 140. This makes it possible to write data transferred from the CPU bus into the USB device 10 and transfer data written into the USB device 10 to the CPU bus.

The transfer controller 100 includes a data buffer 102 (a FIFO, for example). The data buffer 102 is a buffer for temporarily storing data transferred by the transfer controller 100. This data buffer 102 may be realized with a memory such as a RAM, etc.

The processing unit 120 performs an overall processing and control of the USB host controller 40. Some or all of functions of the processing unit 120 may be realized by a CPU and a firmware which operates on the CPU, for example. The processing unit 120 may also be realized by a dedicated hardware circuit.

In the present embodiment, the processing unit 120 includes a CPU 121, a RAM 122, and a ROM 123. In the ROM 123 are stored an OS (operating system) and various programs. The ROM 123 may be an EEPROM, etc.

It may be arranged for the processing unit 120 to not be embedded into the USB host controller 40, so that a CPU I/F which performs an interface process with the main CPU 30 may also be provided. In this case, control of the USB host controller 40 or each circuit block included by the USB host controller 40 is performed by the main CPU 30 via a CPU I/F.

Moreover, programs for operating the processing unit 120 may be stored in a memory (an EEPROM, etc.) on the main CPU side 30, so that, after turning on the power supply, the main CPU 30 may issue a download command, and they may be downloaded to the USB host controller 40 via the CPU bus.

The CPU 121 executes the programs stored in the ROM 123 while utilizing the RAM 122 as a working area.

The registering unit associates topology information of the USB hub to which the USB device is connected via the USB and a special control method for performing a special control of the USB device connected to the USB hub to register the associated results in the register 130 or a different storage area. For the different storage area, a memory space embedded into the electronic equipment unit 20 may be used, or a memory space in a cloud computing environment may be used.

An example of the special control method which is registered by the registering unit according to the present embodiment includes setting the presence/absence of adding a margin to the delay required for recognizing the USB device 10, or in other words, setting a control time for a response of the USB device connected to the USB hub, the control time being of a value other than a default value specified in the USB standard. Setting of such a special control method makes it possible to perform a special control using the control time other than the default value determined by the USB standard when recognizing the USB device 10.

Moreover, a different example of a special control method includes setting a search direction for port searching, or in other words, setting a priority for searching multiple ports of the USB hub. Such setting of a special control method makes it possible to perform a special control which searches for a USB hub port in accordance with the priority.

Furthermore, a different example of the special control method includes setting a flag which causes a Set Port Feature not to be embodied. The Set Port Feature is a request which changes a status of a port that is one type of a request to the USB hub specified in the USB standard. When a flag which causes the Set Port Feature not to be embodied is set, a special control may be performed in which a status of the port connected to the USB hub thereof is not changed.

Moreover, a different example of the special control method includes setting information which makes a specific port of the USB hub to not be searched. Setting of such a special control method makes it possible to perform a special control in which the specific port of the USB hub is not searched.

Furthermore, a different example of the special control method includes setting a flag which causes PORT_POWER not to be embodied for a port to which there is no possibility of connecting by the device. The PORT_POWER is a request for starting power supplying to the port. Setting a flag in which the PORT_POWER is caused not to be embodied makes it possible to perform special control in which power supplying is not started for the port and to achieve energy savings.

In general, the Set Port Feature is used at the time of initialization processing of the USB hub. The Set Port Feature is defined based on matters described in USB 2.0 specification (starting on page 435).

Moreover, the electronic equipment unit 20 and the USB host controller 40 are not limited to a configuration shown in FIG. 1, so that embodying variations are possible which omit some of the constituting elements, change connection states between the constituting elements, or add the constituting elements which are different from those in FIG. 1.

For example, embodying variations are also possible in which features of the transfer controller 100; the processing unit 120; the DMA processing unit 140, etc., are omitted in the USB host controller 40. Moreover, in the electronic equipment unit 20, constituting elements other than elements shown in FIG. 1, such as an operation unit, a display unit, a ROM, a RAM, an imaging unit, a power supply, etc., may also be added.

(List Information)

Figure 2:
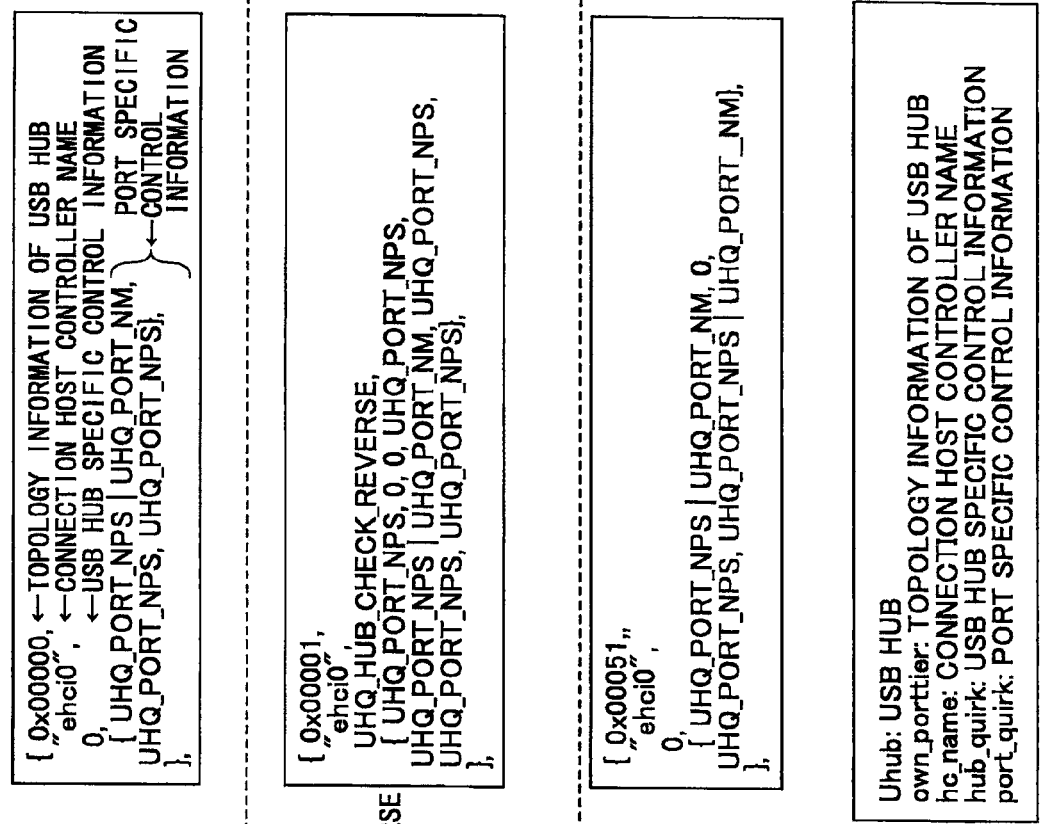
FIG. 2 is a diagram showing an exemplary registration list (for having one host controller) according to one embodiment.
Figure 2:
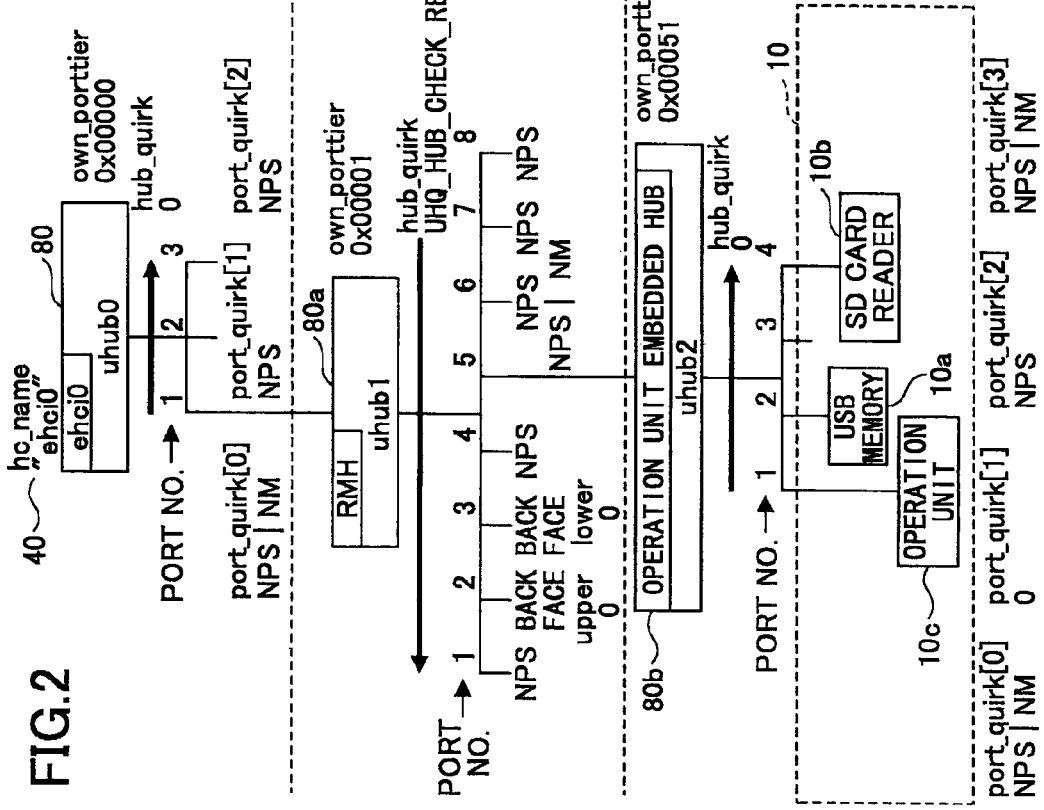

When recognizing the USB device 10, the USB host controller 40 can set four types of information sets of (1) to (4) below for each USB hub 80 in advance. Then, the USB host controller 40 can automatically execute special control based on four types of information sets:

(1) Topology information of the USB hub;
(2) A USB host controller name;
(3) A Special control method at a time of the recognition process of the USB hub; and
(4) Special control method for each port FIG. 2 is an exemplary list for having one USB host controller 40. Normally, in the USB host controller 40 is embedded a special hub called a "root hub". In an example in FIG. 2, a USB hub 80 (uhub0) is connected by default as the root hub to the one USB controller 40 (hc_name "ehci0"). The USB device 10 is connected to a port of this USB hub 80 (uhub0), or a port of a different USB hub connected to the USB hub 80 (uhub0). In the present example, a USB 80a (uhub1) is connected to port 1 of the USB hub 80 (uhub0) and the USB hub 80b (uhub2) is connected to port 5 of the USB hub 80a (uhub1). Multiple USB devices 10 are connected to each port of this USB hub 80b (uhub2). More specifically, in FIG. 2, the USB memory 10a is connected to port 2, the SD card reader 10b is connected to port 4, and the operation unit 10c is connected to port 1. As the USB device required for booting are handled the operation unit 10c in FIG. 2 and a NAND in FIG. 3.

In the present embodiment, the USB host controller 40 automatically controls the USB device based on the special control method set in the USB hub. Then, the following four items need to be set for the USB hub. The set four items are recorded in a location which can be referred to in the USB host controller 40, which is a device driver, at the time of a recognition process of the USB device 10:

(1) "Topology information porttier(own_porttier)" is recorded as topology information of the USB hub;
(2) As a USB host controller name, "connecting host controller name (hc_name)" is recorded;
(3) As a special control method of the USB hub, "USB hub special control (hub quirk)" is recorded; and
(4) As a special control method for each port, "special control for each port (port_quirk)" is recorded.

Details of each item are described below:

(1) The topology information porttier(own_porttier) of the USB hub

In order to uniquely show where the USB hub itself is connected on the topology, a concept of "topology information porttier" is used. The "topology information porttier" has a value of 20 bits. A least significant digit shows which port of the root hub the device is connected. Thereafter, for each increment by one of a depth of a hierarchy, shifting to the left is made, so that a port number of an applicable port is set. Relative to the USB hub 80 (uhub0), the depth of the hierarchy increases by 1 to the USB hub 80a (uhub1) and to the USB hub 80b (uhub2). A reason that the maximum value of "topology information porttier" is 20 bits is that, according to the USB specification, except for the root hub (here the USB hub 80 (uhub0), only up to five stages of the USB hub may be connected.

(2) The USB host controller name (hc_name)

For the multiple host controllers in FIG. 3, a unique port may not be designated with only the topology information porttier. For example, even when the topology information porttier is "0x00000", to which port of ohci0, ohci1, or ehci0 a connection is made may not be specified unless the host controller name is set. Thus, it is necessary to set the host controller name in order to identify each host controller.

In FIG. 3, the connection host controller names "ohci0", "ohci1", and "ehci0" are assigned to the multiple USB host controllers 40a, 40b, and 40c, so that a unique port may be designated by the topology information porttier and the connection host controller name hc_name. In other words, the topology information porttier and the connection host controller name hc_name may be designated to list a special control method for each USB hub port. In FIG. 3, only one root hub exists as the USB hub. Thus, the topology information sets porttier as all the same, so that, for each host controller connected to the same root hub, a special control method for "0x00000, "ohci0""; a special control method for "0x00000, "ohci1""; and a special control method for "0x00000, "ehci0"" are respectively listed.

For one USB host controller 40 in FIG. 2, the connection host controller name hc_name is the same "ehci0", so that, for each USB hub connected to the same host controller, a special control method for "0x00000, "ehci0"", a special control method for "0x00001, "ehci0"", and a special control method for "0x00051, "ehci0"" are respectively listed. As a matter of course, listing is possible even for the feature combining FIGS. 2 and 3.

(3) Special control method (hub_quirk) of the USB hub

The special control method of the USB hub is designated as "hub_quirk". For example, as a special control method of the USB hub, a flag is set which determines whether searching is made from a port with a small port number or from a port with a large port number.

In examples in FIGS. 2 and 3, when a default value "0" is set, a search is made from a smaller port number. On the other hand, when UHQ_HUB_CHECK_REVERSE is set, the search is made from a larger port number. A port searching direction may be designated to cause a device which becomes necessary at the time of booting to be preferentially recognized and realize an increased speed. Moreover, as a different designating method for the special control method of the USB hub "hub_quirk", it is also possible to designate in an order in which the port number is preferred, or a designating method in which a specific port of the USB hub is made to not be searched is also possible.

In the USB hub 80a (uhub1), a UHQ_HUB_CHECK_REVERSE flag is set so as to search from a larger port number. The USB hub 80 (uhub0) and the USB hub 80b (uhub2) are default values, so that searching is made from a smaller port number.

(4) Special control method for the port (port_quirk)

The special control method for the port is designated as "port_quirk". For example, as a special control method for the port, a flag related to a delay of a device connected to each port is set. While UHQ_PORT_NPS and UHQ_PORT_NM are listed and described below as examples of the flag, the flag is not limited thereto. For example, the special control method for the port includes setting a flag which stops power supplying to a port in order to avoid wasteful power supplying to a port to which there is no possibility for the USB device to be connected, besides a flag for control time (response time) of the below-described USB device.

When UHQ_PORT_NPS is set as a flag related to a delay of a device connected to each port, a delay after Set Port Feature (PORT_POWER) can be omitted. This is a flag for a port to which there is no possibility for a self-powered device or a device to be connected (see FIG. 4).

A margin is not added to a delay for all ports of the USB hub if UHQ_PORT_NM is set. For example, even when the margin is to be added to only a delay after Set Address, providing a new flag for the special control method for the port (port_quirk) makes it possible to realize the special control method for the port with little modification, resulting in a higher extendability of special control according to the present embodiment.

(Special Control Process)

Next, special control by the USB host controller 40 according to the present embodiment is described with reference to FIG. 4. FIG. 4 is a flowchart showing a special control processing according to the present embodiment.

For example, as shown in lists A and B in FIG. 4, when managing with an array list of structures having information sets of the above-described (1) to (4) as a set of elements, first in step S10, the USB host controller 40 searches for a group of lists stored in a predetermined storage area. The USB host controller 40 searches for and specifies from the group of lists as to which array list (1) the topology information of the USB hub and (2) the USB host controller name of a parent USB hub apply during the device recognition processing. In FIG. 4, a case in which a list B which matches (1) the topology information of the USB hub and (2) the USB host controller name of the parent USB hub are shown in step S10.

Next, in step S12, the USB host controller 40 requests a USB hub Set Port Feature (PORT_POWER). In response to this request, the USB hub changes the status of each port. The USB hub starts power supplying to the port in response to PORT_POWER. When a flag is set in the array list that causes the Set Port Feature or PORT_POWER not to be carried out, the Port Feature or PORT_POWER is not executed for the port.

Next, in step S14, the USB host controller 40 determines (3) whether "USB hub special control (hub_quirk)" exists as a special control method at the time of recognition process of the USB hub and (4) whether UHQ_PORT_NPS is set for a special control method for the port (port_quirk) as a flag on a delay of a device connected to each port.

If it is determined that the USB hub special control (hub_quirk) exists and UHQ_PORT_NPS is set, the USB host controller 40 omits a delay after the Set Port Feature and proceeds immediately to step S18, where it is determined whether the Set Port Feature (PORT_POWER) is completed for all ports. Until the process is determined to be completed, the USB host controller 40 returns to step S12 and repeats the process in steps S12-S18 for each port.

On the other hand, if it is determined that UHQ_PORT_NPS is not set, the process proceeds to step S16, where a delay is made for a predetermined control time after the Set Port Feature, and, after waiting for a response from the USB device 10, proceeds to step S18 and determines whether the Set Port Feature (PORT_POWER) has been completed for all ports. Until the process is determined to be completed for all the ports, the USB host controller 40 returns to step S12 and repeats the process in steps S12-S18 for each port.

As described above, in the control by the USB host controller 40 according to the present embodiment, a special control is executed for an applicable port of the USB hub specified with (2) the USB host controller name as well as (1) the topology information of the USB hub in accordance with (4) the special control method for the port (port_quirk) as well as the special control method for the USB hub (hub_quirk). In this way, the special control for the USB device 10 connected to the applicable port is made possible.

An item for which the above-described special control is not yet set, such as the USB hub of an external connection not found by the above-described search (step S10 in FIG. 4) of the special control process according to the present embodiment, it is not specified as what is to be specially controlled, so that it is processed based on a default value.

As described above, the USB host controller 40 according to the present embodiment makes it possible to perform a special control of the USB device in units of a port of the USB hub to which the USB device 10 is connected. This makes it possible to prevent a problem of not being able to recognize the USB device 10, or to achieve speeding up in boot time due to performing a special control in units of a port of the USB hub to which the USB device 10 is connected or in time until completion of device recognition.

The special control is also possible in units of the USB hub.

In the foregoing, preferred embodiments related to the controller, the electronic equipment unit including the controller, and the method of controlling the USB device of the present invention have been described in detail. However, a technical scope of the controller, the electronic equipment unit including the controller, and the method of controlling the USB device is not limited thereto. A skilled person in the art of the controller, the electronic equipment unit including the controller, and the method of controlling the USB device of the present invention would obviously have arrived at variations or modifications within the scope of technical ideas described in the claims, so that even these fall into the technical scope of the controller, the electronic equipment unit including the controller, and a method of controlling the USB device of the present invention as a matter of course.

The present application is based on Japanese Priority Application No. 2012-142271 filed on Jun. 25, 2012, the entire contents of which are hereby incorporated by reference.

The invention claimed is:

1. A controller configured to communicate with a USB (universal serial bus) device via a selected one of a plurality of USB ports, the controller comprising:
   one or more USB hubs configured to connect the controller to the USB devices via the selected USB port;
   a registering unit configured to register information that uniquely identifies the selected USB port with a control scheme that controls device initialization of the USB device; and
   a processing unit configured to,
      specify the control scheme corresponding to the selected port based on the registered information, and
      execute the device initialization of the USB device connected to the USB hub based on the control scheme on a port-by-port basis such that each of the plurality of USB ports of the USB hub is individually assigned a time frame to initially recognize the USB device connected thereto allowing different ones of the plurality of USB ports to have different time frames assigned thereto, the time frame being of a value other than a default value including a delay compliant with a USB standard.

2. The controller as claimed in claim 1, wherein
   the registering unit is configured to register the control scheme for each of the plurality of USB ports;
   the processing unit is configured to specify the control scheme for each port of the USB hub to which the USB device is connected; and
   the USB hub is configured to execute the device initialization of the USB device for each port based on the control scheme specified for each port.

3. The controller as claimed in claim 2, wherein
   the registering unit is configured to register a priority for searching multiple ones of the plurality of ports of the USB hub as the control scheme;
   the processing unit is configured to specify the control scheme in an order from the port with the higher priority; and
   the USB hub is configured to execute the device initialization of the USB device in the order from the port with the higher priority based on the control scheme specified.

4. The controller as claimed in claim 1, wherein,
   the processing unit is configured to specify the time frame other than the default value; and
   the USB hub is configured to execute the device initialization of the USB device based on the time frame other than the default value.

5. The controller as claimed in claim 1, wherein, as the control scheme,
   the registering unit is configured to register information to set a specific port of the USB hub not be searched;
   the processing unit is configured to specify information indicating that it is unnecessary to search the specific port; and wherein
   the USB hub is configured to execute the device initialization based on the default value for the USB device connected to the port for which the searching is specified to be unnecessary based on the information on the non-necessity of the searching of the port specified.

6. The controller as claimed in claim 1, wherein
   the registering unit is configured to register identification information of multiple controllers connected to the USB hub in association with the topology information of the USB hub;
   the processing unit configured to specify the control method corresponding to the identification information of the controller and the topology information of the USB hub to which the USB device is connected based on the identification information of the multiple controllers and the topology information registered; and wherein
   the USB hub is configured to execute the device initialization of the USB device connected to the USB hub of the controller having identification information based on the control scheme specified by the processing unit.

7. An electronic equipment unit, comprising:
   the controller as claimed in claim 1; and
   a host CPU configured to connect to the controller via a bus.

8. A method of controlling a USB device by a controller, the controller configured to communicate with the USB device via a selected one of a plurality of USB ports, comprising:
   connecting the controller to the USB device via the selected USB port associated with a USB hub;
   registering information that uniquely identifies the selected USB port with a control scheme that controls device initialization of the USB device;
   specifying the control scheme corresponding to the selected port based on the registered information; and
   executing the device recognition of the USB device connected to the USB hub based on the control scheme on a port-by-port basis such that each of the plurality of USB ports of the USB hub is individually assigned a time frame to initially recognize the USB device connected thereto allowing different ones of the plurality of USB ports to have different time frames assigned thereto, the time frame being of a value other than a default value including a delay compliant with a USB standard.

9. The controller as claimed in claim 1, wherein if the USB device connected to the selected port is utilized at a time of booting, the processing unit is configured to set the control scheme for the selected port as high priority.

10. The controller of claim 1, wherein the processing unit is configured to assign the control scheme USB port by USB port such that each of the USB ports is assigned a customized control scheme.

11. The method as claimed in claim 8, wherein if the USB device connected to the selected port is utilized at a time of booting, the specifying sets the control scheme for the selected port as high priority.

12. The method as claimed in claim 8, wherein the specifying assigns the control scheme USB port by USB port such that each of the USB ports is assigned a customized control scheme.

* * * * *